US012286897B2

(12) United States Patent
Aitchison et al.

(10) Patent No.: US 12,286,897 B2
(45) Date of Patent: Apr. 29, 2025

(54) AIRFOIL RIBS FOR ROTOR BLADES

(71) Applicant: PRATT & WHITNEY CANADA CORP., Longueuil (CA)

(72) Inventors: Paul Aitchison, Hamilton (CA); Paul Stone, Guelph (CA); Dikran Mangardich, Richmond Hill (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/805,049

(22) Filed: Jun. 2, 2022

(65) Prior Publication Data

US 2023/0392503 A1 Dec. 7, 2023

(51) Int. Cl.

| | |
|---|---|
| ***F01D 5/14*** | (2006.01) |
| ***F01D 5/02*** | (2006.01) |
| ***F01D 5/30*** | (2006.01) |
| ***F01D 5/34*** | (2006.01) |
| ***F04D 29/32*** | (2006.01) |
| ***F04D 29/38*** | (2006.01) |

(52) U.S. Cl.

CPC ............. *F01D 5/147* (2013.01); *F01D 5/021* (2013.01); *F01D 5/141* (2013.01); *F01D 5/3007* (2013.01); *F01D 5/34* (2013.01); *F04D 29/324* (2013.01); *F04D 29/325* (2013.01); *F04D 29/384* (2013.01); *F05D 2240/307* (2013.01); *F05D 2250/181* (2013.01); *F05D 2260/941* (2013.01)

(58) Field of Classification Search

CPC .......... F01D 5/021; F01D 5/141; F01D 5/147; F01D 5/34; F05D 2250/294; F05D 2250/181; F05D 2250/182; F05D 2260/941; F04D 29/324; F04D 29/325; F04D 29/388; F04D 29/384

USPC .................................. 416/236 R, 236 A, 237

See application file for complete search history.

(56) References Cited

U.S. PATENT DOCUMENTS

| | | | | |
|---|---|---|---|---|
| 2,193,616 A * | 3/1940 | Baumann | B63H 1/28 | 416/93 R |
| 3,012,709 A * | 12/1961 | Schnell | F04D 29/324 | 416/236 R |
| 3,776,363 A * | 12/1973 | Kuethe | F01D 5/16 | 416/235 |
| 4,108,573 A * | 8/1978 | Wagner | F01D 5/141 | 416/500 |
| 5,244,345 A | 9/1993 | Curtis | | |
| 5,755,031 A * | 5/1998 | Baumgarten | F01D 5/005 | 29/889.1 |
| 6,565,324 B1 * | 5/2003 | Phillipsen | F01D 5/20 | 416/228 |

(Continued)

FOREIGN PATENT DOCUMENTS

| | | |
|---|---|---|
| GB | 2251897 A | 7/1992 |
| WO | 20210004821 A1 | 1/2021 |

OTHER PUBLICATIONS

European Search Report issued in counterpart application 23177093.4 on Jul. 20, 2023.

*Primary Examiner* — Christopher Verdier

(74) *Attorney, Agent, or Firm* — NORTON ROSE FULBRIGHT CANADA LLP

(57) ABSTRACT

A rotor of an aircraft engine has a plurality of blades extending radially from a disc. At least one of the blades has an airfoil, a root and a tip. The airfoil has a crack-mitigating rib extending chordwise along the airfoil. The crack-mitigating rib is disposed radially closer to the root than to the tip.

17 Claims, 9 Drawing Sheets

(56) References Cited

U.S. PATENT DOCUMENTS

| | | | | |
|---|---|---|---|---|
| 10,844,726 | B2 | 11/2020 | Horn et al. | |
| 2002/0127108 | A1* | 9/2002 | Crall | F01D 5/143 29/889.23 |
| 2005/0186080 | A1* | 8/2005 | Chivers | F01D 5/3061 416/223 R |
| 2019/0024673 | A1 | 1/2019 | Anderson | |
| 2019/0120061 | A1 | 4/2019 | Horn et al. | |
| 2019/0178094 | A1 | 6/2019 | Schutte | |

* cited by examiner

AIRFOIL RIBS FOR ROTOR BLADES

TECHNICAL FIELD

The disclosure relates generally to rotors and, more particularly, to rotor blades.

BACKGROUND

Rotors are typically used in turbine engine applications, and include a hub from which a plurality of circumferentially arranged rotor blades radially extend. The rotor blades may be subjected to stress fields during engine operation, which may extend into the rotor hub from which the blades extend. Such phenomenon may be accentuated in integrally bladed rotors (IBRs), whose rotor hub and blades form a unitary structure.

SUMMARY

In accordance with aspect of the present disclosure, there is provided a rotor of an aircraft engine, the rotor comprising: a disc having an outer rim surface extending circumferentially about a rotation axis and circumscribed by an outer rim diameter; a plurality of blades extending to radially outward of the outer rim surface relative to the rotation axis, at least one blade of the plurality of blades including: an airfoil spaced radially outward from the outer rim surface relative to the rotation axis; a root extending from the outer rim surface to the airfoil; a tip radially outward of the airfoil; and at least one crack-mitigating rib extending chordwise along the airfoil, the at least one crack-mitigating rib being radially closer to the root than to the tip.

In accordance with another aspect, there is provided a monolithic bladed rotor of a turbine engine, the monolithic bladed rotor comprising: a disc having a rim extending circumferentially about a rotation axis and circumscribed by an outer rim diameter; a plurality of blades projecting radially outwardly from the rim relative to the rotation axis, each blade of the plurality of blades including: an airfoil spaced radially outward from the outer rim surface relative to the rotation axis; a root extending from the outer rim surface to the airfoil; a tip radially outward of the airfoil; and at least one crack-mitigating rib projecting from the airfoil, extending chordwise along the airfoil and having a cross-section defining an arcuate convex crest portion, the at least one crack-mitigating rib being radially closer to the root than to the tip.

In accordance with a further aspect, there is provided a turbine engine comprising: an axial compressor including a bladed rotor about a rotation axis and a rotor shroud defining a radially outer boundary of the axial compressor around the bladed rotor, the bladed rotor including: a rim defining a radially inner boundary of the gas path; a plurality of blades extending radially outwardly from the rim into the gas path, each blade of the plurality of blades including: an airfoil spaced radially outward from the outer rim surface relative to the rotation axis; a root extending from the outer rim surface to the airfoil; a tip radially outward of the airfoil; and at least one crack-mitigating rib projecting from the airfoil, extending chordwise along the airfoil and having a cross-section defining an arcuate convex crest portion, the at least one crack-mitigating rib being radially closer to the root than to the tip.

BRIEF DESCRIPTION OF THE DRAWINGS

Reference is now made to the accompanying figures in which:

FIG. 3A shows an enlarged view of a portion of FIG. 3;

FIG. 4A shows an enlarged view of a portion of FIG. 4;

FIG. 4B shows an enlarged view of another portion of FIG. 4;

FIG. 9 is a perspective view of a portion of a bladed rotor having blades each provided with a crack-mitigating rib having a pair of ends;

DETAILED DESCRIPTION

The present disclosure relates to technologies for mitigating crack propagation in bladed rotors. In some embodiments, the mitigation of crack propagation in bladed rotors may be achieved by way of a rib formed on an outer surface of an airfoil of one or more blades of the bladed rotor. The rib may be configured to influence crack propagation to reduce the risk of a large and uncontained fragment of the bladed rotor being released from the bladed rotor due to fracture ultimately resulting from crack propagation during operation of the turbine engine.

Figure 1:
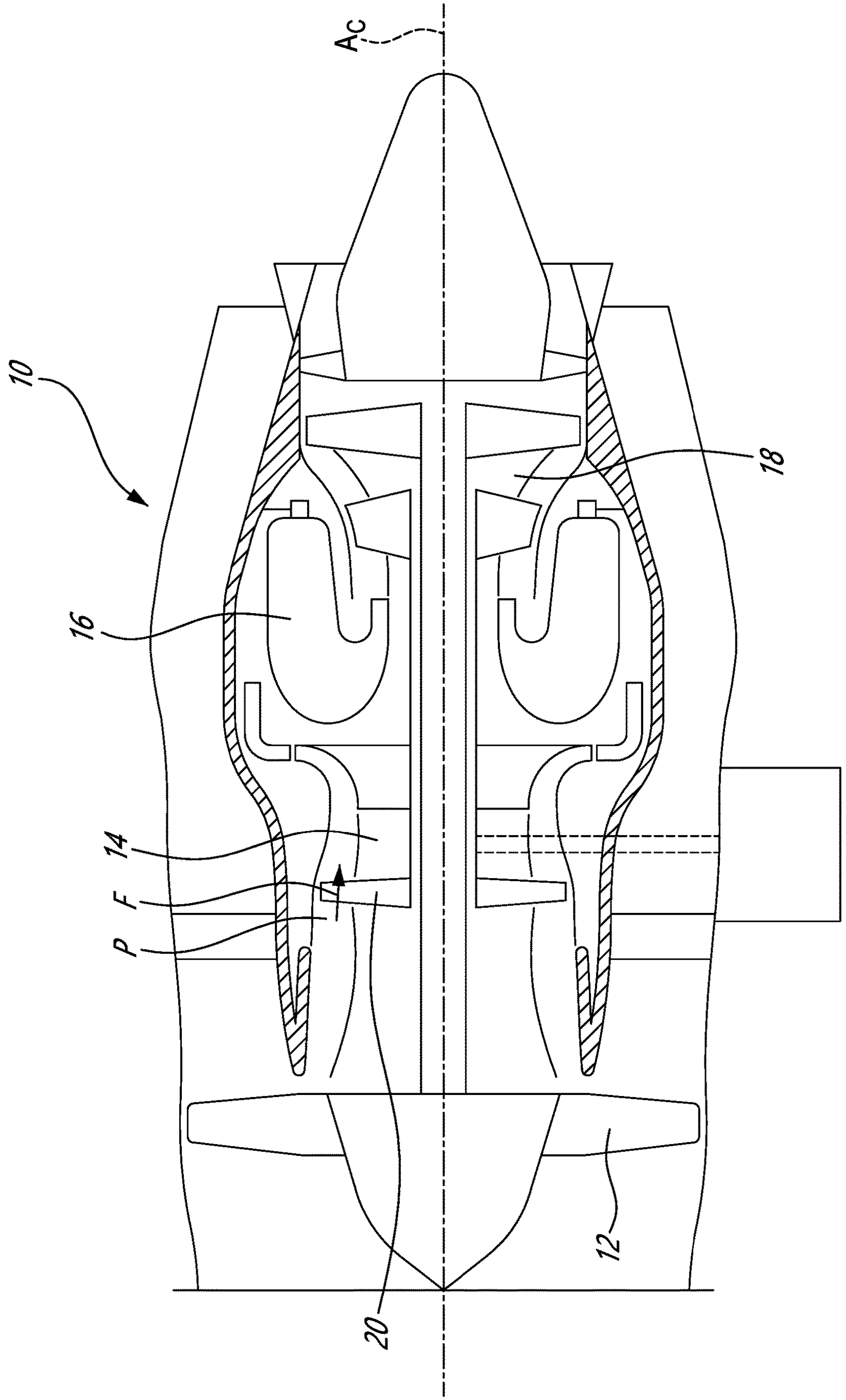
FIG. 1 is a schematic cross-sectional view of a turbine engine.

FIG. 1 illustrates a turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Depending on the embodiment, the compressor section 14 includes one or more bladed rotors 20. The compressor section 14 thus includes one or more axial compressors, or compressor stages, each having a suitable rotor 20. The rotor 20 may be rotatable about a rotation axis $A_R$ (FIG. 2) during operation of engine 10. In some embodiments of engine 10, the rotation axis $A_R$ may correspond to a central axis $A_C$ of engine 10. The rotor 20 may be part of a high-pressure spool or of a low-pressure spool of the engine 10. In some embodiments of the engine 10, the fan 12 may instead or in addition also be a rotor 20 as described herein. Although the engine 10 depicted in FIG. 1 is of the turbofan type, it is understood that aspects of the present disclosure are also applicable, mutatis mutandis, to other types (e.g., turboshaft, turboprop) of turbine engines, including hybrid aircraft engines.

The compressor 14 may define a gas path P of the engine 10. The gas path P may be defined by and be disposed between a radially inner shroud and a radially outer shroud of the compressor 14. The gas path P may have an annular configuration and may surround the central axis $A_C$. Lengthwise, the gas path P may extend principally axially relative to the central axis $A_C$ at the location of the rotor 20. The rotor may be used as an airfoil-based axial compressor in the engine 10 and may compress and convey the air toward the combustor 16 during operation of the engine 10. The air being compressed through the gas path P in the region of the rotor 20 may flow principally parallel to the rotation axis $A_R$ (i.e., axially). FIG. 1 shows an expected flow direction F of the air interacting with the rotor 20 during operation of the engine 10.

Figure 2:
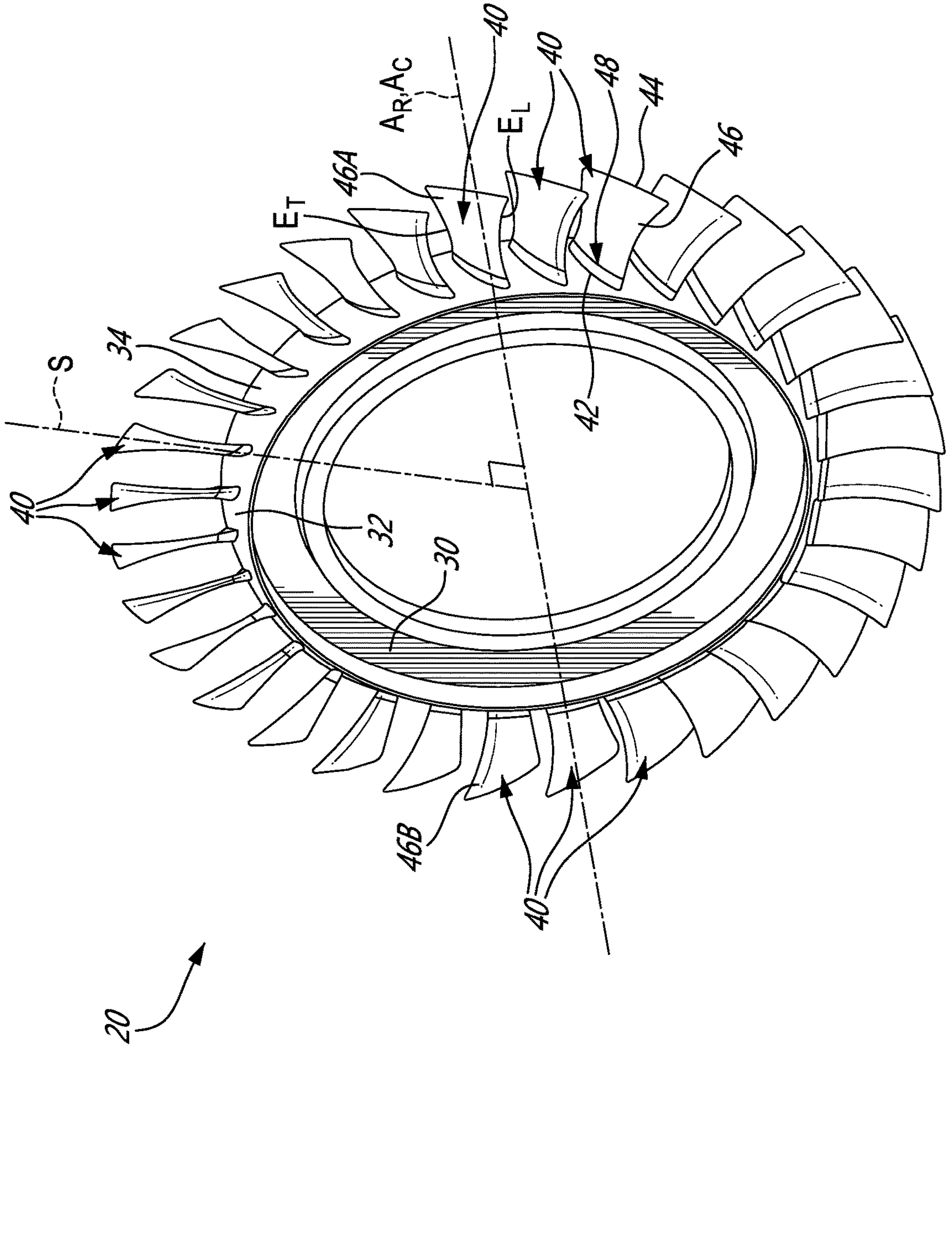
FIG. 2 is a perspective view of an integrally bladed rotor having blades each provided with a crack-mitigating rib.

As shown in FIG. 2, the rotor 20 may be of the integrally bladed type. Indeed, the rotor 20 may be a monolithic component (i.e., a unitary structure) that includes a central portion also referred to as a disc of the rotor 20, or hub 30, having a peripheral portion, or rim 32. The rotor 20 also includes a plurality of blades 40 extending from the rim 32. The blades 40 may be said to stem, or project, from a radially outer surface 34 of the rim 32 (hereinafter outer rim surface 34). Although the rotor 20 of this embodiment is integrally-bladed, the rotor 20 could alternatively be of the separately bladed type, in which case the blades 40 are individually and removably attached to the rim 32. In either case, each blade 40 has a radially-inner end referred to as a root 42 (or base), a radially-outer end referred to as a tip 44, and an airfoil 46 between the root 42 and the tip 44. A stacking line S may extend generally radially relative to the rotation axis $A_R$, which may provide a frame of reference for a given blade 40 and related elements described herein.

The airfoil 46 is a portion of the blade 40 having a cross-section profile suitable for deflecting oncoming air to impart desired aerodynamic properties to the flow of air downstream thereof. The airfoil 46 has opposite lateral sides including a suction side 46A that is generally associated with a higher flow velocity and a lower static pressure, and a pressure side 46B that is generally associated with a lower flow velocity and a higher static pressure. Each airfoil 46 also has an upstream side defined by a leading edge E L located at an upstream junction between the suction and pressure sides 46A, 46B, and a downstream side defined by a trailing edge $E_T$ located at a downstream junction between the suction and pressure sides 46A, 46B. The leading and trailing edges $E_L$, $E_T$ may also be said to form vertices of the cross-section profile of the airfoil 46. A notional straight line connecting the vertices is conventionally referred to as a chord $C_L$ (FIG. 3), or chord line. The term "chordwise" employed hereinafter thus refers to a path along a periphery of the blade 40 that generally follows the chord $C_L$ along either the suction side 46A or the pressure side 46B, either generally toward the leading edge $E_L$ or generally toward the trailing edge $E_T$. A chordwise path may in some cases vary radially relative to the rotation axis $A_R$.

The root 42 is a peripheral surface of the blade 40 that extends from the outer rim surface 34 to the airfoil 46. In this embodiment, the root 42 is a sole concave surface, or fillet. Other shapes are contemplated for the root 42. In some embodiments, a curvature of the root 42 may be specified by one or more radii values, which may be uniform or may vary chordwise.

Figure 3:
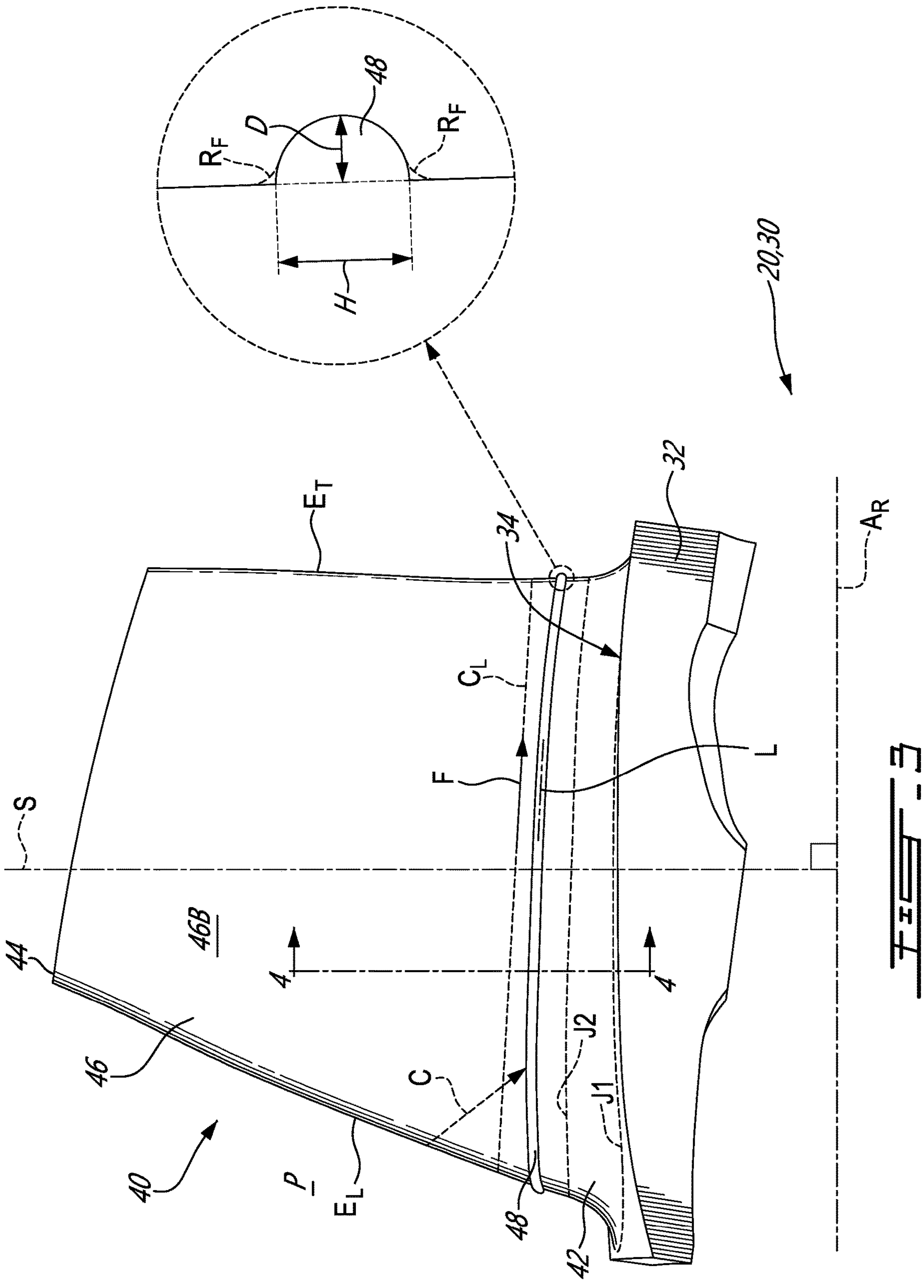
FIG. 3 is an elevation view of a portion of the rotor of FIG. 2.

Referring to FIGS. 3 and 3A, the outer rim surface 34, the root 42 and the airfoil 46 may be said to form portions of a flow-interfacing surface of the rotor 20. The outer rim surface 34 and the root 42, and the root 42 and the airfoil 46 respectively may meet without the flow-interfacing surface exhibiting tangency discontinuities depending on the embodiment. The outer rim surface 34 meets the root 42 at a first junction J1 (or radially-inner junction) of the flow-interfacing surface. In this embodiment, at the first junction J1, the outer rim surface 34 blends into the root 42. Indeed, a curvature of the flow-interfacing surface merely exhibits a reversal at the first junction J1, defining no discontinuity or discrete edge. In other embodiments, the flow-interfacing surface may define a discontinuity at the first junction J1. A radial location of the first junction J1 relative to the rotation axis $A_R$ corresponds to an inner transition radius of the root 42. The outer rim surface 34 being in this case generally cylindrical, the outer rim surface 34 defines an outer rim radius relative to the rotation axis $A_R$ that corresponds to the inner transition radius. In some embodiments, the inner transition radius may vary slightly axially relative to the rotation axis $A_R$ between a minimum inner transition radius value and a maximum inner transition radius value. The root 42 meets the airfoil 46 at a second junction J2 (or radially-outer junction) of the flow-interfacing surface. In this embodiment, at the second junction J2, the root 42 blends into the airfoil 46, defining no discontinuity. In other embodiments, the flow-interfacing surface may define a discontinuity at the second junction J2. A radial location of the second junction J2 relative to the rotation axis $A_R$ corresponds to an outer transition radius of the root 42. In some embodiments, the outer transition radius may vary chordwise between a minimum outer transition radius value and a maximum outer transition radius value.

In some embodiments, either one or both of the first and second junctions J1, J2 is defined by a radial location at which a local radius of the curvature of the flow-interfacing surface is infinite, or at least greater than at an adjacent radial location comprised by either the outer rim surface 34 or the airfoil 46.

The root 42 may be said to be bound radially relative to the rotation axis $A_R$ by a notional annular envelope defined radially inwardly by the inner transition radius and radially outwardly by the outer transition radius. A radial dimension of the annular envelope relative to the rotation axis $A_R$ defines a maximum radial height $R_H$ (FIG. 4) of the root 42. The maximum radial height $R_H$ may thus correspond to a difference between the outer transition radius (e.g., the maximum outer transition radius value defined by the second junction J2, if applicable) and the inner transition radius (e.g., the minimum inner transition radius value defined by the first junction J1, if applicable). Depending on the embodiment, the maximum radial height $R_H$ may be located at various chordwise locations of the blade 40, for example on the suction side 46A, on the pressure side 46B, on the upstream side (i.e., at the leading edge $E_L$) and/or on the downstream side (i.e., at the trailing edge $E_T$).

Still referring to FIG. 3, the blade 40 includes at least one rib 48 extending along an exterior surface thereof. The rib 48 is an elongated protrusion that is structured and arranged to be crack-mitigating, or crack-retardating. The rib 48 extends longitudinally along a longitudinal path L that intersects projected trajectories of cracks that may form in the blade 40 under certain circumstances during engine operation, for example stresses associated with fatigue (low-cycle and/or high-cycle) and/or impacts (i.e., foreign object damage). An exemplary crack schematically shown at C originates in the vicinity of the leading edge $E_L$ and extends toward the trailing edge $E_T$ albeit at an angle relative to the chord $C_L$ toward the rib 48. As such, a projected trajectory of the crack C is toward the hub 30 yet is intersected by the rib 48. The longitudinal path L of the rib 48 may follow the chord $C_L$ and/or the rotation axis $A_R$ at least in part. By this arrangement, the rib 48 may guide further propagation of the crack C along the chord $C_L$ and/or the rotation axis $A_R$ so as to discourage the crack C from growing near or even into the hub 30. For example, a central portion of the rib 48 (i.e., a portion of the rib 48 spaced from the leading and trailing edges $E_L$, $E_T$) may follow the chord $C_L$ and/or the rotation axis $A_R$ whereas end portions of the rib 48 (i.e., a portion of the rib 48 extending from the central portion to either one of the leading and trailing edges $E_L$, $E_T$) may veer relative to the chord $C_L$ and/or the rotation axis $A_R$, either radially inwardly or radially outwardly. In the depicted embodiment, both end portions veer radially inwardly as they extend away from the central portion. Along the longitudinal path L, the rib 48 has a cross-section profile that may vary in size and/or shape. For example, at a given location along the longitudinal path L, the cross-section profile is semi-circular or semi-ellipsoidal in shape. The cross-section profile has a depth dimension D (i.e., a rib depth D of the rib 48 at a certain location along the longitudinal path L) defined by a distance across which the rib 48 projects from the airfoil 46. The depth D may be said to extend in a normal direction defined locally by the airfoil 46. The cross-section profile also has a height dimension H (i.e., a rib height H of the rib 48 at a certain location along the longitudinal path L) defined by a distance across which the rib 48 extends transversely to the depth D (or normal direction) and to the longitudinal path L. In some embodiments, rib fillets $R_F$, or concave transition portions of the cross-section profile, are defined at junctions between an outer surface of the rib 48 and the airfoil 46. A portion of the cross-section profile exclusive of the concave transition portions includes a vertex, or crest, of the cross-section profile and may be referred to as a convex crest portion. In embodiments, the convex crest portion is arcuate in shape. Depending on the embodiment, the rib height H is either inclusive or exclusive of the rib fillets $R_F$. The location, size and shape of the rib 48 are determined so as to form a local decrease in a stress intensity range of the blade 40, and thereby either slow down or arrest crack propagation in a localized manner, thereby confining the crack to the blade 40. As such, the rib 48 is located closer to the root 42 than to the tip 44 of the blade 40. Stated otherwise, the rib 48 is located in a radially innermost half of the airfoil 46. Depending on the embodiment, the rib 48 may be located in the root 42 or in the airfoil 46, for example at a location spaced radially outwardly from the second junction J2 as depicted in FIG. 3. Depending on the embodiment, the rib 48 may be sized such that the rib depth D is less than the rib height H. In some such embodiments, the rib depth D and the rib height H are defined such that a depth ratio of the rib depth D over the rib height H is between 0.01 and 0.5. In this example, the rib depth D and the rib height H may be expressed by the following formula:

$$0.01 \leq \frac{D}{H} \leq 0.5$$

Figure 4:
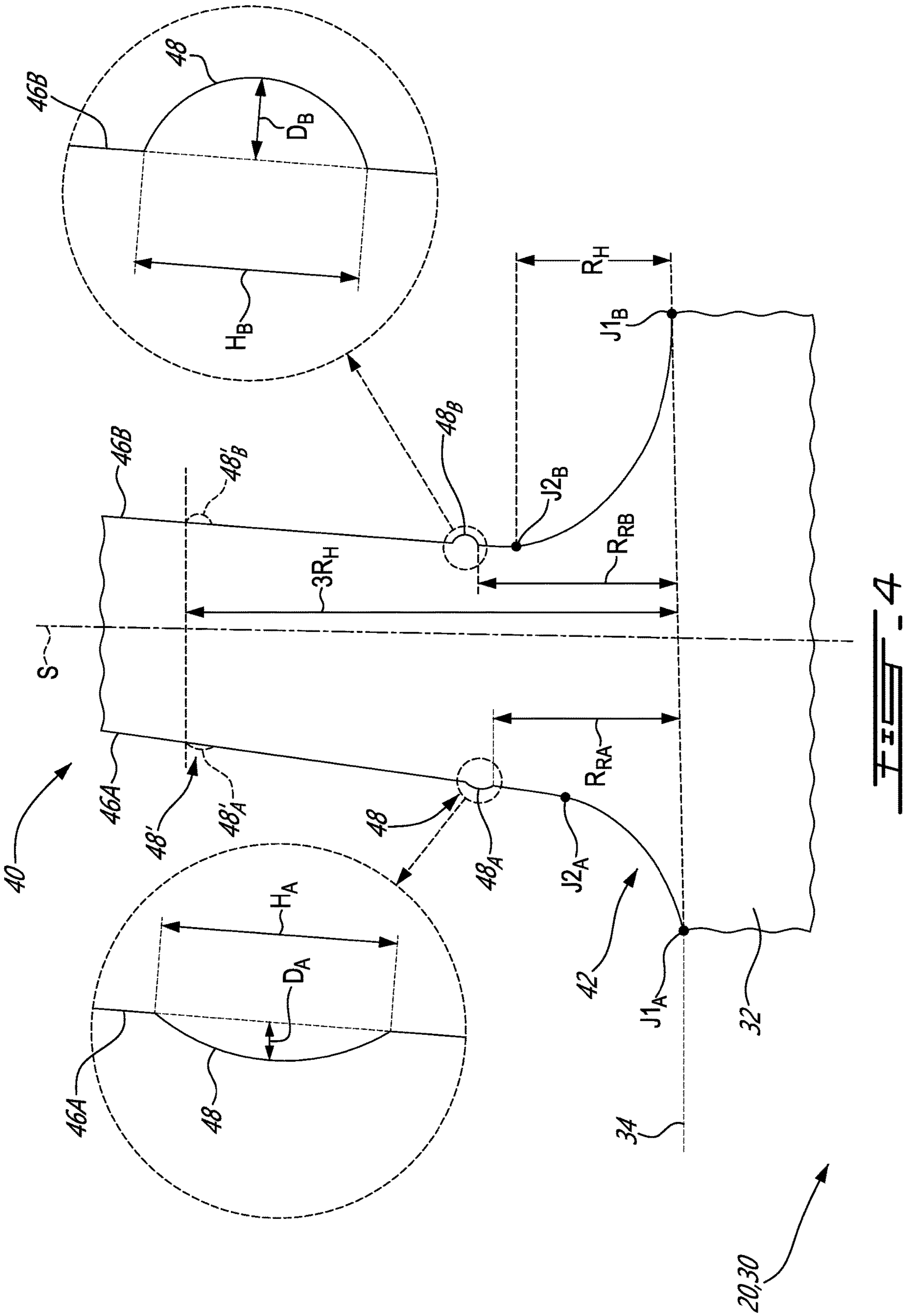
FIG. 4 is a cross-section view of the portion of the bladed rotor taken along the line 4-4 of FIG. 3.

Referring to FIGS. 4, 4A, and 4B, possible locations, sizes and shapes contemplated for different ribs 48, or even for a given rib 48, will now be described. The location of the rib 48 may be determined according to the maximum radial height of the root 42, shown at $R_H$, corresponding to a difference between the outer transition radius of the second junction J2 and the inner transition radius of the first junction J1. As the radial location of the first and second junctions J1, J2 may vary around the blade 40, the radial height $R_H$ of the root 42 may consequently vary. For example, in the depicted example, the first junction J1 is at a same radius both on the suction side 46A (shown at J1$_A$) and on the pressure side 46B (shown at J1$_B$) of the blade 40, as is typically the case due to the cylindricity of the outer rim surface 34. On the other hand, the radial location of the second junction J2 typically varies due to the inclination of the blade 40. For example, the second junction J2 is at a radius that is greater on the pressure side 46B (shown at J2$_B$) than on the suction side 46A (shown at J2$_A$). The radial height $R_H$ may be said to correspond to a radial dimension of a first annular envelope of the blade 40 defined outwardly by a greatest radius of the second junction J2 and inwardly by a smallest radius of the first junction J1, regardless of their respective locations. In embodiments, the rib 48 is located inside a second annular envelope of the blade 40 defined inwardly by the outer rim surface 34 (or the first junction J1) and having a radial dimension corresponding to three times the radial height $R_H$ (shown at 3$R_H$). Stated otherwise, the rib 48 extends radially outwardly relative to the first junction (or inner transition radius) by no more than 3$R_H$, i.e., no more than three times the radial height $R_H$. The rib 48 could in some embodiments be located immediately radially inward of the outer boundary of the second annular envelope, such as exemplary outer rib 48' shown at an outermost location within the second annular envelope.

Characteristics of the rib 48 may vary depending on the chordwise location, and depending on the side 46A, 46B of the blade 40 for a given chordwise location. At the chordwise location depicted in FIG. 4, a suction-side portion 48'$_A$ and a pressure-side portion 48'$_B$ of the outer rib 48' are at a same radial location on either side of the blade 40. However, in the depicted example, a suction-side portion 48$_A$ and a pressure-side portion 48$_B$ of the rib 48 are at different radial locations within the second annular envelope, namely at a suction-side radial location $R_{RA}$ and at a pressure-side radial location $R_{RB}$ respectively. In this embodiment, the pressure-side radial location $R_{RB}$ is radially outward of the suction-side radial location $R_{RA}$. It broadens the design space and allows for more solutions. Also, depending on the embodiment, a suction-side depth $D_A$ of the suction-side portion 48A may be different than a pressure-side depth DB of the pressure-side portion 48B. In the depicted embodiment, the pressure-side depth $D_B$ is greater than the suction-side depth $D_A$. A relatively smaller suction-side depth DA may be favorable to rotor aerodynamics. Generally, since aero is less concerned with airflow on the pressure side, the rib can be emphasized more on the pressure side to give a larger cross section and slow the crack further. The placement of the rib on the pressure side is generally less sensitive to aero and therefore can be placed in the most suitable structurally advantages height on the blade. Depending on the embodiment, a suction-side height $H_A$ of the suction-side portion 48A may be different than a pressure-side height $H_B$ of the pressure-side portion 48B. In the depicted embodiment, the suction-side height $H_A$ is greater than the pressure-side height $H_B$. According to some applications, the pressure or suction side does not need as much height on rib to have the same benefit of retarding the crack. The height of the rib may be dictated by the local stress field that is different between the pressure and suction sides. If the highest stress occurs on the suction side at a greater height than the pressure side, it may desirable to put the rib in this location to slow the potential crack.

Figure 6:
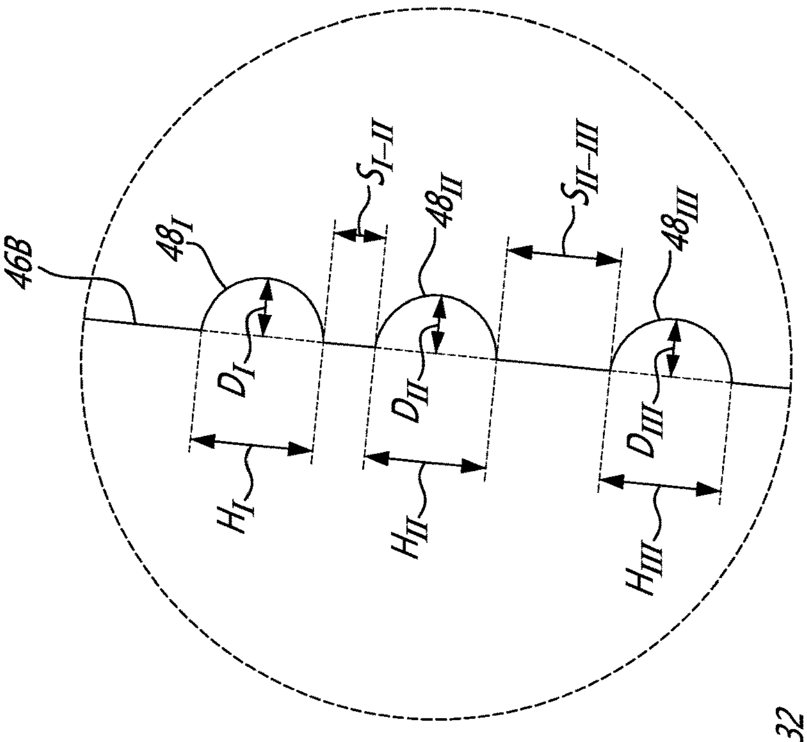
FIG. 6 is a cross-section view of the portion of the bladed rotor taken along the line 6-6 of FIG. 5.
Figure 5:
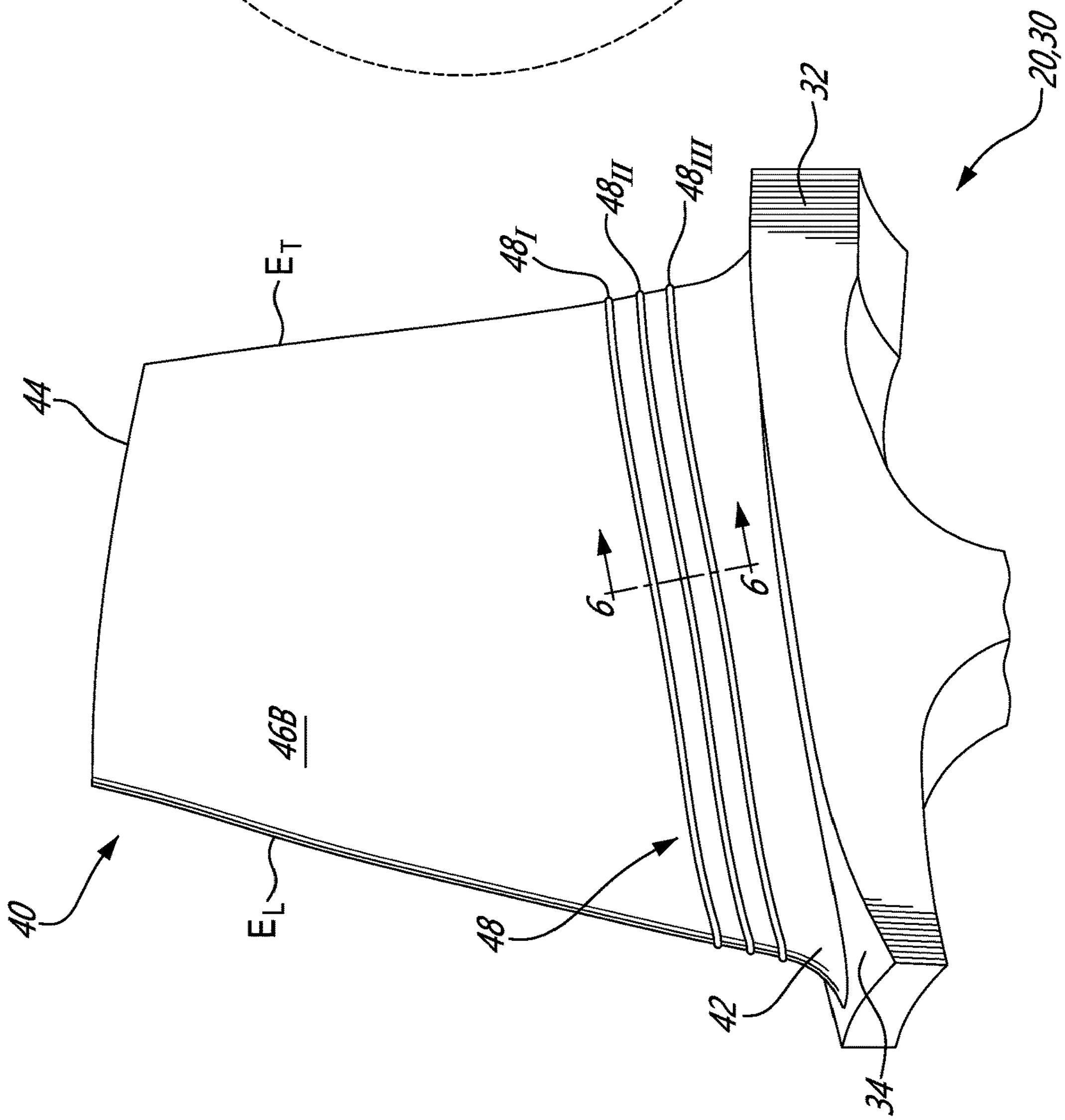
FIG. 5 is a perspective view of a portion of a bladed rotor having blades each provided with a plurality of crack-mitigating ribs.

Referring to FIGS. 5 and 6, a given blade 40 may be configured with a plurality of ribs 48, for example a first rib $48_I$ (here shown as an outermost one of the ribs 48) a second rib $48_{II}$ (here shown as an intermediary one of the ribs 48) and a third rib $48_{III}$ (here shown as an innermost one of the ribs 48) spaced radially from one another relative to the rotation axis $A_R$ within the second annular envelope. As the case may be for a blade 40 with a single-rib configuration, individual characteristics of the rib 48 may vary depending on the chordwise location, as well as depending on the side 46A, 46B of the blade 40 for a given chordwise location. The first rib $48_I$, the second rib $48_{II}$ and third rib $48_{III}$ respectively have a first depth $D_I$, a second depth $D_{II}$ and a third depth $D_{III}$, and a first height $H_I$, a second height $H_{II}$ and a third height $H_{III}$. At the chordwise location depicted in FIG. 6, the depths $D_I$, $D_{II}$, $D_{III}$ are the same and the heights $H_I$, $H_{II}$, $H_{III}$ are the same, although depthwise and/or height-wise variations in one or more of the ribs $48_I$, $48_{II}$, $48_{III}$ are contemplated. Still referring to FIG. 6, spacings of the ribs $48_I$, $48_{II}$, $48_{III}$ will now be described. Any spacing between two consecutive ribs $48_I$, $48_{II}$, $48_{III}$, for example a spacing $S_{I-II}$ between the first and second ribs $48_I$, $48_{II}$ or a spacing between the second and third ribs $48_{II}$, $48_{III}$, may be defined as a function of the size of the adjacent ribs 48. Taking the first and second ribs $48_I$, $48_{II}$ and the corresponding spacing $S_{I-II}$ for example, the spacing $S_{I-II}$ may be defined according to the following formula:

$$0.25 \leq \frac{S_{I-II}}{H_I + H_{II}} \leq 5$$

In this example, a ratio of a spacing of two consecutive ribs over a sum of the corresponding rib heights is between 0.25 and 5. The spacing between two consecutive ribs $48_I$, $48_{II}$, $48_{III}$ may in some embodiments vary chordwise. In some embodiments, at a given chordwise location and on a given side 46A, 46B of the blade the spacings corresponding to two pairs of consecutive ribs $48_I$, $48_{II}$, $48_{III}$ may be different. For example, the spacing is shown as being locally greater than the spacing $S_{I-II}$.

Figure 7:
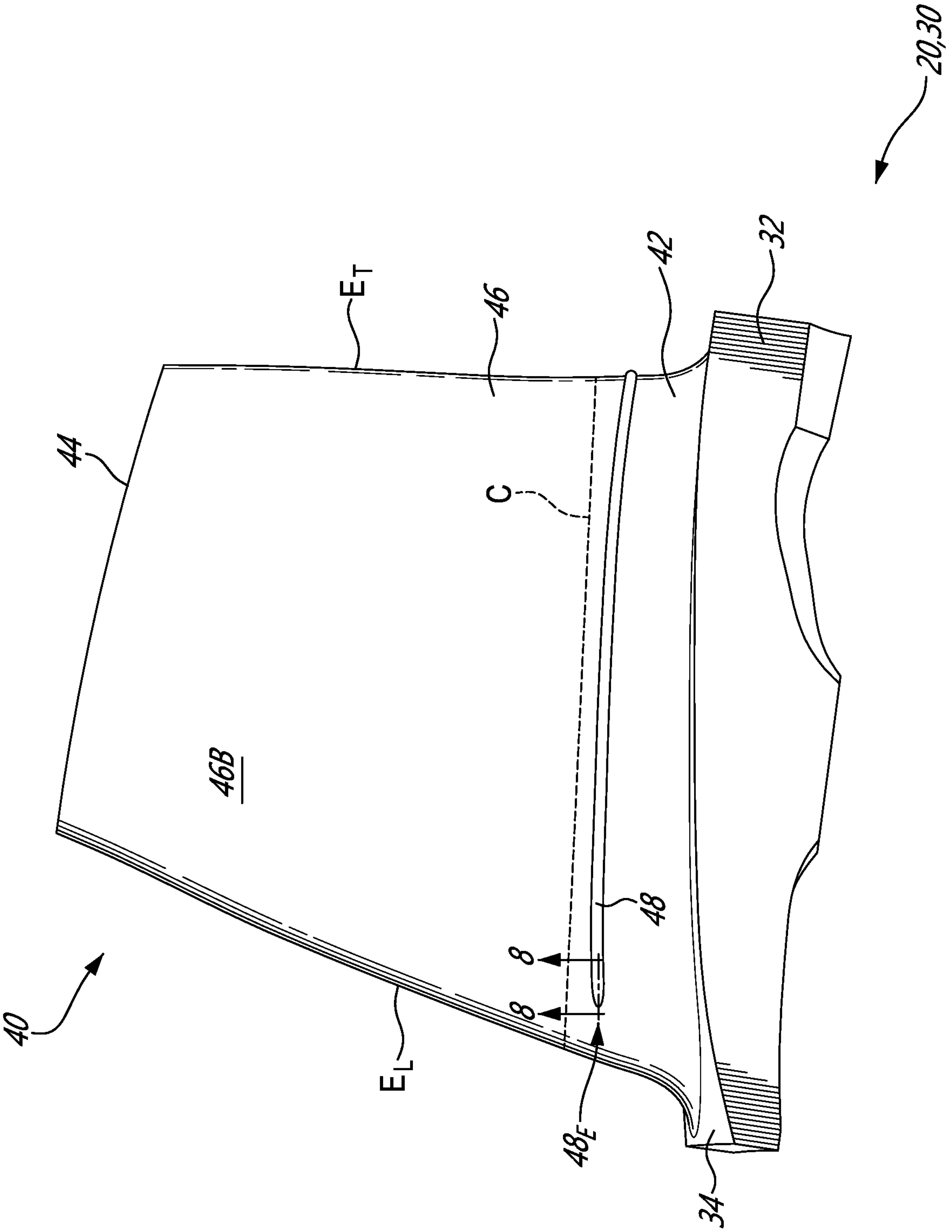
FIG. 7 is a perspective view of a portion of a bladed rotor having blades each provided with a crack-mitigating rib having an end.
Figure 8:
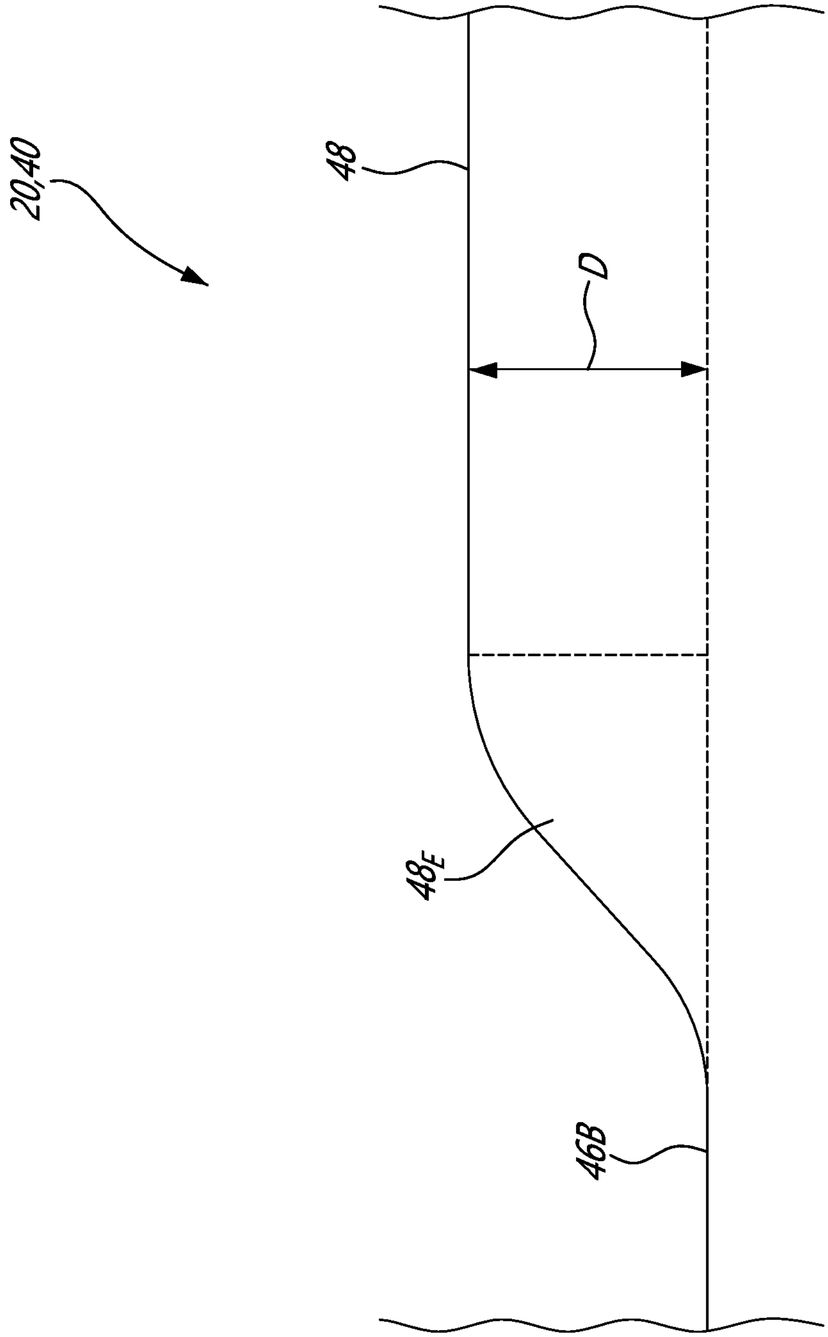
FIG. 8 is a cross-section view of the portion of the bladed rotor taken along the line 8-8 of FIG. 7.
Figure 6:
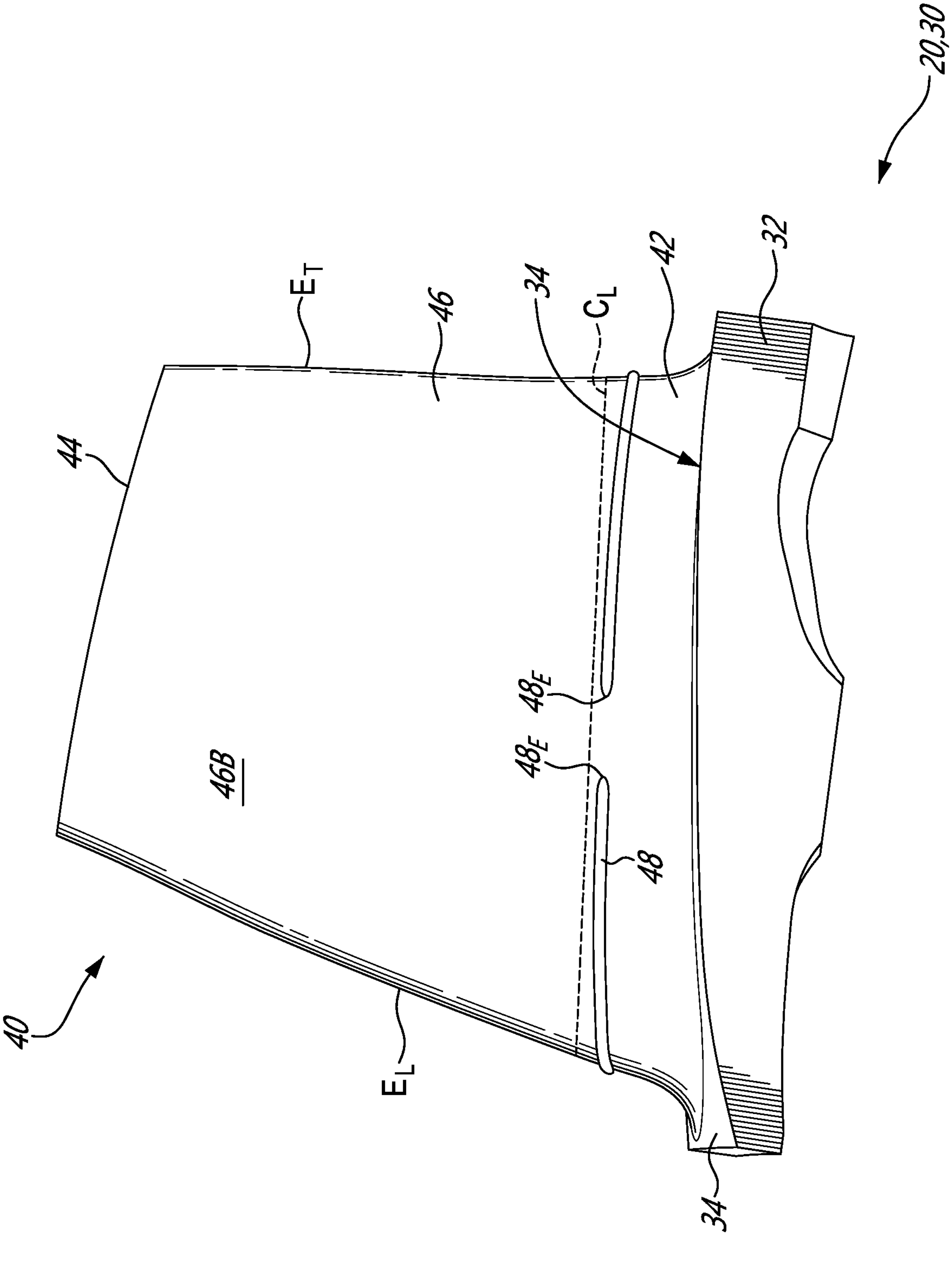

Referring to FIGS. 7 to 9, a rib 48 may either define a full periphery of its corresponding blade 40 or may in some cases be discontinuous at one or more chordwise locations, i.e., the rib 48 may have an end 48E at a given chordwise location. Such rib discontinuities, or ends 48E, may be provided at locations subjected to lower stresses and/or deemed less prone to crack propagation. Stated otherwise, the presence of ribs 48 at such locations would not provide a meaningful life benefit, or fragment containment benefit, to the rotor 20. For example, the rib 48 of FIG. 7 has an end $48_E$ located proximate to the leading edge $E_L$, whereas the rib 48 of FIG. 9 has a pairs of ends $48_E$ disposed on the pressure side 46B and spaced from one another, defining a discontinuity therebetween. Pairs of ends $48_E$ may be provided similarly on either side 46A, 46B, although different arrangements are contemplated. As shown in FIG. 8, each end $48_E$ may have a sloped profile, i.e., each end $48_E$ may progressively slim down depthwise so as to blend into the adjoining surface (in this case the pressure side 46B) of the airfoil 46. Junctions between such sloped ends 48E and the airfoil 46 exhibit no curvature discontinuity.

Figure 10B:
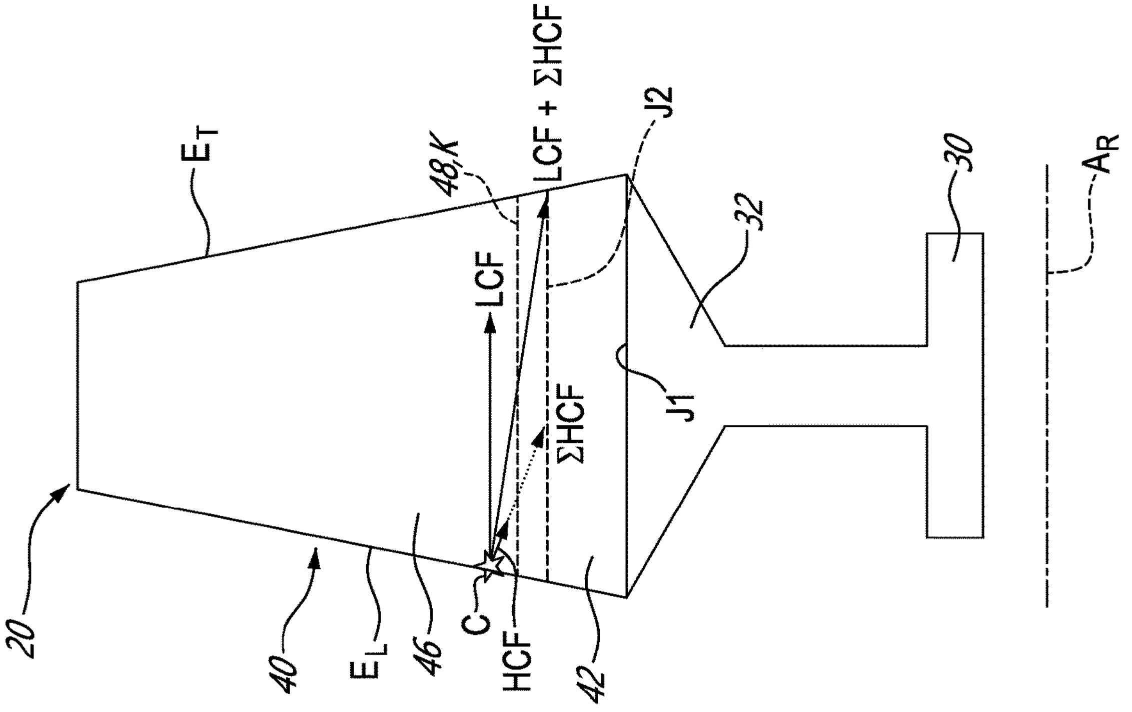
FIG. 10B is a schematic radial cross-section view of a portion of an exemplary bladed rotor having blades each provided with a crack-mitigating rib.
Figure 10A:
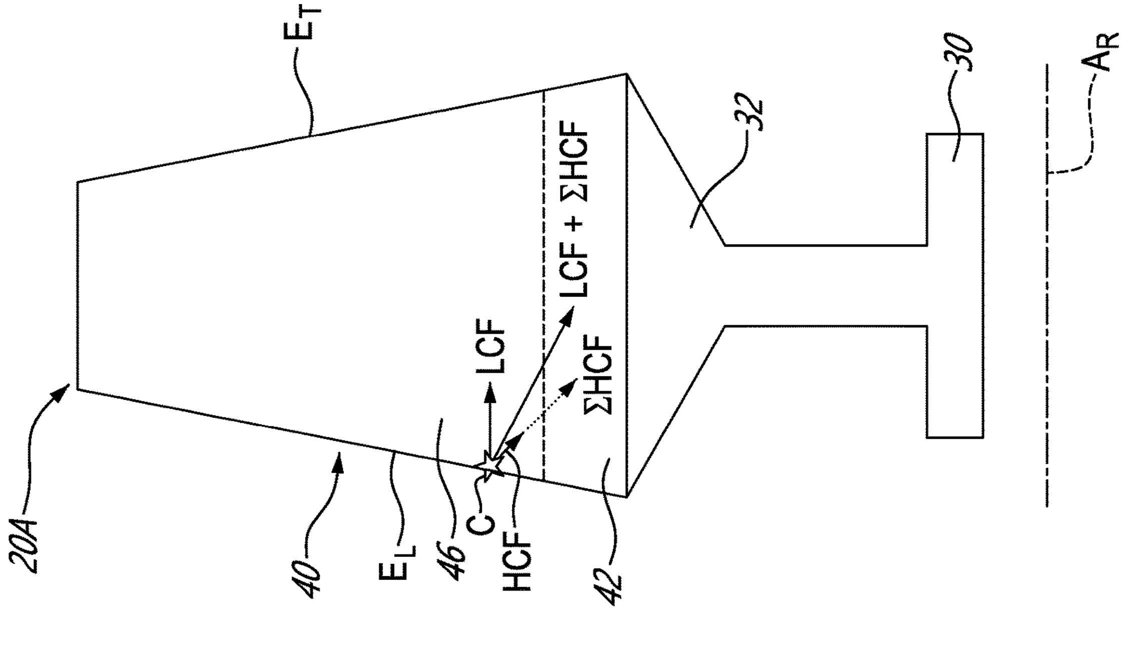
FIG. 10A is a schematic radial cross-section view of a portion of an exemplary bladed rotor without crack-mitigating rib(s)

FIG. 10A is a schematic axial cross-section view of a portion of an exemplary bladed rotor 20A without any crack-mitigating rib 48. FIG. 10B is a schematic axial cross-section view of a portion of the rotor 20 provided with a crack-mitigating rib 48. In operation, the blades 40 may be subjected to a steady stress associated with low-cycle-fatigue (LCF) as a result of centrifugal and thermal loads. In a typical flight mission, a major LCF cycle occurs during takeoff and one or more minor LCF cycles occur during descent. The blades 40 may also be subjected to vibratory stresses associated with high-cycle-fatigue (HCF) occurring at resonance conditions for example, which may occur several times during a typical flight mission. When the useful life of a rotor 20 nears its end and a crack C is initiated on the airfoil 46 of one of its blades 40, damage tolerance methods and tools may be used to determine the remaining size and propagation trajectory of the crack C leading up to failure, and thereby determine a residual lifetime of the rotor 20, for example in terms of numbers of remaining flight missions. For a given flight mission, the growth rate of a crack can be described as a linear summation of individual LCF and HCF growth rates. The size and trajectory of a crack may be important for determining the potential size, shape, and mass of a fragment that may be released from the rotor 20A, 20 upon failure. For a crack C that originates from the airfoil 46, the resulting rupture can be classified either as either a relatively benign blade rupture as the resulting fragment may be contained by the casing of the engine 10 surrounding the rotor 20A, 20. On the other hand, the resulting rupture can be classified as a disc rupture (i.e., a rupture of the hub 30), which may be more troublesome as the resulting fragment may not be contained by the casing.

The trajectory of a propagating crack C may be a function of a combined LCF-HCF stress field. Mathematically, the combined LCF-HCF stress field may be represented as a vector summation of the individual LCF and HCF crack growth contributions (e.g., LCF+ΣHCF). In general, LCF loads dominated by radial centrifugal loading may tend to grow the crack parallel to the rotation axis $A_R$, thereby promoting a contained failure mode, i.e., a contained blade rupture. HCF loads may exhibit more complex stress fields and may occur at resonance conditions. For resonance modes with significant airfoil-hub participation, there is potential for the resulting dynamic stress field to grow the crack into the hub 30. Even if the magnitude of the dynamic stresses are low in comparison to the steady stresses, the resulting modal frequency and accumulated HCF cycles may amplify the HCF vector (i.e., ΣHCF). In such case, the resulting failure mode may be an uncontained failure mode, i.e., an uncontained disc rupture.

As mentioned hereinabove, the addition of the rib 48 to the blade 40, for instance to the airfoil 46 radially outward of the root 42, may guide or otherwise influence crack propagation, thereby discouraging a crack originating on the airfoil 46 from growing into the hub 30. In other words, the presence of the rib 48 may influence crack propagation to promote a contained blade release as opposed to an uncontained disc rupture. However, the primary function of the rib 48 is to locally reduce the stresses in the rib and to slow down or retard the crack. The ribs reduce the nominal stress as well as geometry factor both which relate to stress intensity range and rate of crack growth.

The rib 48 may be used on the rotor 20 where the resulting airfoil steady stresses are low in comparison to dynamic stresses and the corresponding LCF lives are high. The rib 48 may be designed and positioned such that it does not produce a new critical location and the minimum life of the rotor 20 is not significantly altered. For example, the rib 48 may be added to a blade 40 radially outward of the second junction J2, hence without altering a typical or desired blade geometry at the root 42.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

The invention claimed is:

1. An aircraft engine, comprising:

a rotor, the rotor having:

a disc having an outer rim surface extending circumferentially about a rotation axis and circumscribed by an outer rim diameter;

a plurality of blades extending to radially outward of the outer rim surface relative to the rotation axis, at least one blade of the plurality of blades including:

an airfoil spaced radially outward from the outer rim surface relative to the rotation axis;

a root extending from the outer rim surface to the airfoil, the root corresponding to a fillet being radially bound between an inner transition radius and an outer transition radius of the blade, a difference between the outer and the inner transition radii defining a maximum radial height of the fillet;

a tip radially outward of the airfoil; and at least one crack-mitigating rib extending chordwise along the airfoil, the at least one crack-mitigating rib being radially closer to the root than to the tip, the at least one crack-mitigating rib having a suction side portion located on a suction side of the at least one blade and a pressure side portion located on a pressure side of the at least one blade, the at least one crack-mitigating rib extending radially outwardly relative to the inner transition radius by no more than three times the maximum radial height of the fillet, the at least one crack-mitigating rib having a cross-section defining an arcuate convex crest portion, the at least one crack-mitigating rib projecting from the airfoil by a rib depth and extending radially by a rib height, the rib depth being less than the rib height.

2. The aircraft engine of claim 1, wherein the rib depth and the rib height are defined such that a depth ratio of the rib depth over the rib height is between 0.01 and 0.5.

3. The aircraft engine of claim 1, wherein the at least one crack-mitigating rib has a cross-section including a concave transition portion and the convex crest portion between the airfoil and the concave transition portion, the rib height being defined exclusive of the concave transition portion.

4. The aircraft engine of claim 1, wherein the at least one crack-mitigating rib includes a first rib and a second rib spaced radially from one another relative to the rotation axis.

5. The aircraft engine of claim 4, wherein the first and second ribs are spaced from one another by a rib spacing and respectively extend radially by a first rib height and a second rib height, and the rib spacing, the first rib height and the second rib height are defined such that a spacing ratio of the rib spacing over a sum of the first and second rib heights is between 0.25 and 5.

6. The aircraft engine of claim 1, wherein the suction side portion and the pressure side portion respectively projecting from the suction side and the pressure side of the airfoil by a suction side depth and a pressure side depth greater than the suction side depth.

7. The aircraft engine of claim 6, wherein the suction side portion and the pressure side portion are portions of a same rib.

8. The aircraft engine of claim 1, wherein the airfoil defines a leading edge and a trailing edge and extends chordwise therebetween, and the at least one crack-mitigating rib has a sloped end at a chordwise location of the airfoil between the leading and trailing edges.

9. The aircraft engine of claim 1, wherein a radial distance between the at least one crack-mitigating rib and the root varies chordwise.

10. A monolithic bladed rotor of a turbine engine, the monolithic bladed rotor comprising:

a disc having a rim extending circumferentially about a rotation axis and circumscribed by an outer rim surface;

a plurality of blades projecting radially outwardly from the rim relative to the rotation axis, the disc and the plurality of blades being parts of the monolithic bladed rotor, each blade of the plurality of blades including:

an airfoil spaced radially outward from the outer rim surface relative to the rotation axis;

a root extending from the outer rim surface to the airfoil;

a tip radially outward of the airfoil; and at least one crack-mitigating rib projecting from the airfoil, extending chordwise along the airfoil and having a cross-section defining an arcuate convex crest portion, the at least one crack-mitigating rib being radially closer to the root than to the tip, the at least one crack-mitigating rib having a suction side portion located on a suction side of the blade and a pressure side portion located on a pressure side of the blade, the at least one crack-mitigating rib radially distanced from the rim no more than three times a maximum radial height of a fillet at a junction between the airfoil and the rim, the arcuate convex crest portion defining a rib height in a radial direction relative to the rotation axis and a rib depth transversely to the rib height, the rib depth being less than the rib height.

11. The monolithic bladed rotor of claim 10, wherein the rib depth and the rib height are defined such that a depth ratio of the rib depth over the rib height is between 0.01 and 0.5.

12. The monolithic bladed rotor of claim 10, wherein the rib depth varies chordwise.

13. The monolithic bladed rotor of claim 10, wherein the at least one crack-mitigating rib includes a first rib and a second rib spaced radially from one another relative to the rotation axis.

14. The monolithic bladed rotor of claim 13, wherein the first and second ribs are spaced from one another by a rib spacing and respectively extend radially by a first rib height and a second rib height, and the rib spacing, the first rib height and the second rib height are defined such that a spacing ratio of the rib spacing over a sum of the first and second rib heights is between 0.25 and 5.

15. The monolithic bladed rotor of claim 10, wherein the root is radially bound between an inner transition radius and an outer transition radius of the blade, a difference between the outer and the inner transition radii defining a maximum radial height of a transition surface, the at least one crack-mitigating rib extending radially outwardly relative to the inner transition radius by no more than three times the maximum radial height.

16. A turbine engine comprising:

an axial compressor including a bladed rotor about a rotation axis and a rotor shroud defining a radially outer boundary of the axial compressor around the bladed rotor, the bladed rotor including:

a rim defining a radially inner boundary of a gas path;

a plurality of blades extending radially outwardly from the rim into the gas path, each blade of the plurality of blades including:

an airfoil spaced radially outward from the radially inner boundary—relative to the rotation axis;

a root extending from the radially inner boundary to the airfoil, the root corresponding to a fillet;

a tip radially outward of the airfoil; and at least one crack-mitigating rib projecting from the airfoil, extending chordwise along the airfoil and having a cross-section defining an arcuate convex crest portion, the at least one crack-mitigating rib being radially closer to the root than to the tip, the at least one crack-mitigating rib having a suction side portion located on a suction side of the at least one-blade and a pressure side portion located on a pressure side of the blade, a radial distance between the at least one crack-mitigating rib and the rim being at most three times a radial height of the fillet, the at least one crack-mitigating rib projecting from the airfoil by a rib depth and extending radially by a rib height, the rib depth being less than the rib height.

17. The turbine engine of claim 16, wherein the at least one crack-mitigating rib, the airfoil and the root of each blade have tangential continuity with the rim.

* * * * *